United States Patent
Wolfe

[11] 3,894,854
[45] July 15, 1975

[54] DUST COLLECTOR APPARATUS
[75] Inventor: Russell C. Wolfe, Baltimore, Md.
[73] Assignee: Dixie Mfgr. Co., Baltimore, Md.
[22] Filed: Nov. 27, 1973
[21] Appl. No.: 419,387

[52] U.S. Cl. .................. 55/294; 55/302; 55/337; 55/379; 55/459; 55/472; 55/DIG. 26
[51] Int. Cl.[2] .................................. B01D 46/04
[58] Field of Search .......... 55/272, 273, 282, 288, 55/293, 294, 295, 296, 297, 298, 299, 300, 301, 302, 303, 304, 332, 334, 337, 367, 374, 378, 454, 459, 472, 480, 498, 499, 500, DIG. 26, 379; 187/81, 89; 182/112

[56] References Cited
UNITED STATES PATENTS

| | | | |
|---|---|---|---|
| 515,767 | 3/1894 | Harmon | 55/374 |
| 887,264 | 5/1908 | Newman | 187/81 |
| 2,338,504 | 1/1944 | Foster | 55/374 |
| 2,584,746 | 2/1952 | Sheldon | 55/294 |
| 2,738,856 | 3/1956 | Perlis | 55/294 |
| 2,861,649 | 11/1958 | Junkmann | 55/294 |
| 2,868,320 | 1/1959 | Westlin | 55/337 |
| 3,349,548 | 10/1967 | Boyen | 55/459 |
| 3,386,530 | 6/1968 | Thompson | 182/112 |
| 3,695,007 | 10/1972 | Farnworth | 55/337 X |

Primary Examiner—Frank W. Lutter
Assistant Examiner—David L. Lacey
Attorney, Agent, or Firm—Lawrence J. Winter

[57] ABSTRACT

A dust collector apparatus having a cyclone filter stage in its upper section in communication with a filter plenum section, in turn, in communication with a plurality of filter tubes depending from a plate member. A hopper is disposed below the lower ends of the filter tubes for receiving contaminants therein.

The apparatus is provided with a blow case manifold which directs a stream of high velocity air from the outside of the filter tubes through the filter medium to dislodge the cake accumulating on the inside surface. The blow case continually travels the length of the tubes to dislodge the cake as it travels and is provided with a flexible air hose means for supplying air thereto. The blow case manifold is provided with flexible guide means to keep the manifold properly centered as it travels up and down along the filter tubes. The filter tubes are provided with means for easily replacing the tubes in the apparatus and drive means are provided for moving the blow case manifold along the longitudinal axis of the tubes and is provided with safety brake means for preventing the blow case manifold from falling in the casing should the drive means fail.

17 Claims, 11 Drawing Figures

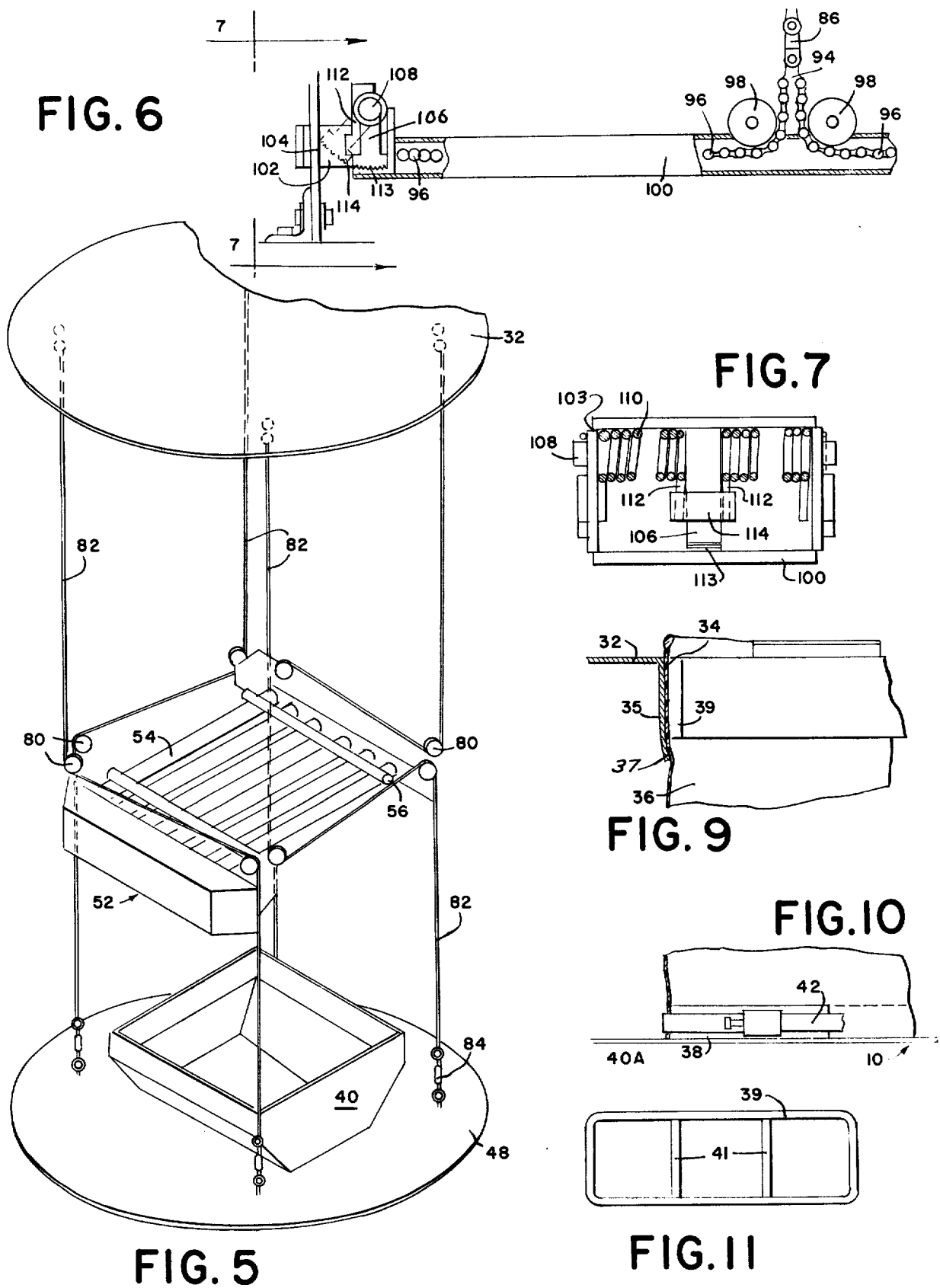

DUST COLLECTOR APPARATUS

The present invention relates to a dust collection system and more particularly to a dust collection system that is a self contained unit and can be pre-packaged and delivered to various locations to provide an air pollution control system.

It is an object of the present invention to provide a collector having a cyclone stage and a tube filter stage that is designed to handle both heavy particles and fine dust in removing contaminants from the atmosphere in manufacturing processes in factories, buildings and the like.

It is another object of the present invention to provide a dust collector system for apparatus working on a reverse air flow principle which apparatus operates at a constant low pressure air drop to insure adequate suction in the exhaust system at all times.

It is another object of the present invention to provide a dust collector system in which internal air pressure in the filter tubes, rather than external, eliminates the need for metal supports for the filter tubes resulting in a simple installation and long serviceable life.

Another object of the present invention is to provide a dust collection apparatus having a first cyclone stage in which the air flow is subjected to strong centrifical force which forces heavier contaminants in the air stream to the wall of the unit where it thins out and is exited from the second stage of the apparatus.

It is another object of the present invention to provide a dust collection apparatus in which the heavier particles are forced out of the air stream by a centrifical action in a first stage and thereafter the clean air is then forced into an inverted vortex pattern by the air following it and flows through a diaphragm plate member separating the cyclonic centrifical force stage from a filter plenum section, said first section being remotely positioned from the air exit of the apparatus resulting in less material passing into the air filter section resulting in longer filter tube life.

It is another object of the present invention to provide a cyclone-filter stage combination dust collecting apparatus separated from one another by an air plenum chamber so that the heavier contaminant in the air is removed in the cyclone section thus eliminating heavy dirt laden air in the filter section to prevent the possibility of abrasion on the filter tube.

It is still another object of the present invention to provide a dust collection apparatus in which the entrance to the filter tubes is in a vertically downward direction, after the heavier particles are removed in a cyclone stage so that whatever materials are contained in the incoming air stream that are not subject to Brownian motion or indefinite suspension, will fall directly into the hopper means provided in the apparatus.

It is still another object of the present invention to provide a two stage dust collection system in which the filter tubes require no internal metal supporting frames, since the air pressure inside the tubes is greater than the outside thereof within the dust collection apparatus housing.

It is yet another object of the present invention to provide a dust collection apparatus in which particles too fine to fall into the hopper collection means are collected on the inside surfaces of the tubes and blow case manifold means are provided to direct a thin-width ribbon of high velocity air from the outside of the tube through the filter medium to dislodge any cake accumulating on the inside surface thereof.

It is another object of the present invention to provide a blow case manifold which continuously travels the length of the filter tubes in the dust collection apparatus to dislodge the accumulated cake as it travels so that agglomerated fines are dislodged and fall into the hopper collection means therein.

It is yet another object of the present invention to provide a dust collection apparatus having a plurality of flexible vertically disposed filter tubes therein that are provided with a blow case manifold that continuously travels the length of the tubes to dislodge any filter cake formed therein which manifold is provided with guide pulley means to keep the manifold properly centered in the apparatus housing as it moves upwardly and downwardly.

Yet, another object of the present invention, is to provide a dust collection apparatus having means for easily clamping the plurality of filter tubes carried in it so that the bags are easily replaceable for maintainance purposes.

Still, another object of this invention is to provide a dust collection apparatus having a continuously traveling blow case manifold to direct a ribbon of high velocity air from the outside of the filter tubes therein to dislodge any cake accumulated on the inside surface of the tube, which manifold is further provided with safety feature means to keep the manifold from falling should its drive means fail.

Various other objects and advantages of the present invention will be readily apparent from the following detailed description when considered in connection with the accompanying drawings forming a part thereof and in which:

FIG. 5 is a more or less diagramatic view of the guide means for the blow case manifold;

FIG. 6 is a detailed view of the safety catch means for the blow case manifold;

FIG. 7 is a section taken along the lines 7—7 of FIG. 6;

FIG. 9 illustrates the clamping means for the filter tubes for clamping the upper ends of the tubes in the plenum chamber tube sheet;

FIG. 10 is a side elevation view of the lower tube and clamping means.

FIG. 11 is a view of the top tube clamp.

Figure 1:
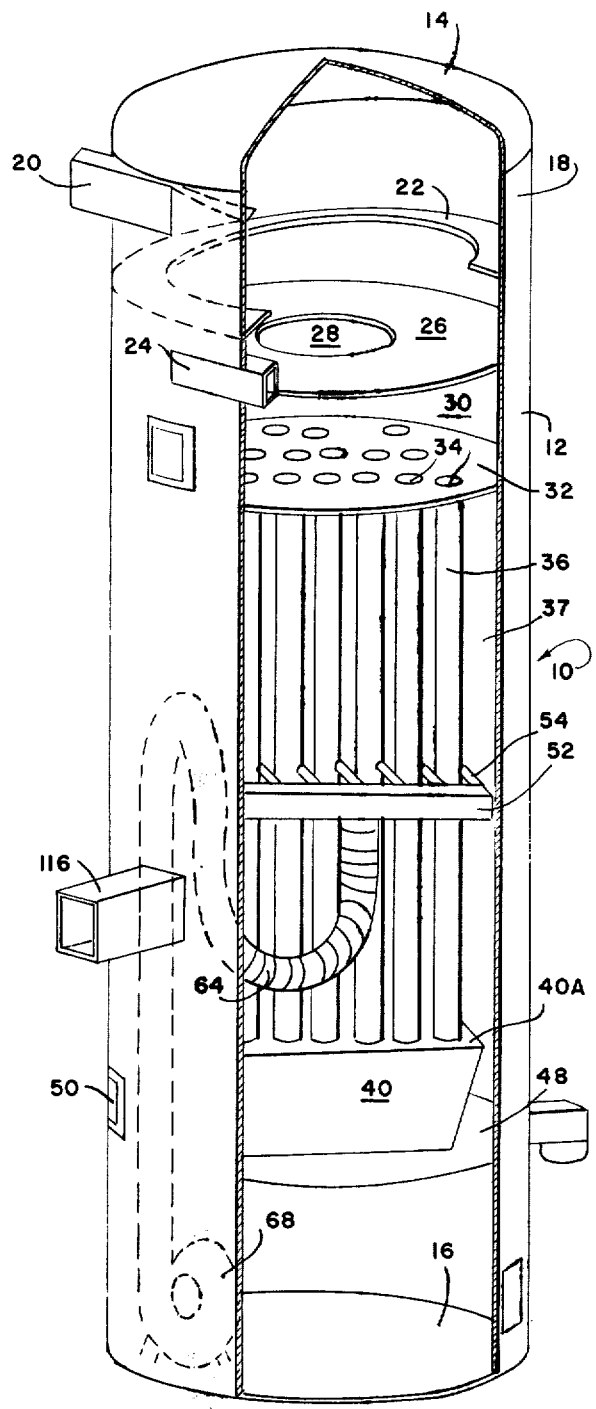
FIG. 1 is a more or less schematic view of the dust collector apparatus embodied in the present invention.

Referring to the drawings, the reference numeral 10 generally designates the dust collector system or apparatus of the present invention having a cylindrical housing 12 with a dome shaped top 14 and a bottom 16.

Figure 8:
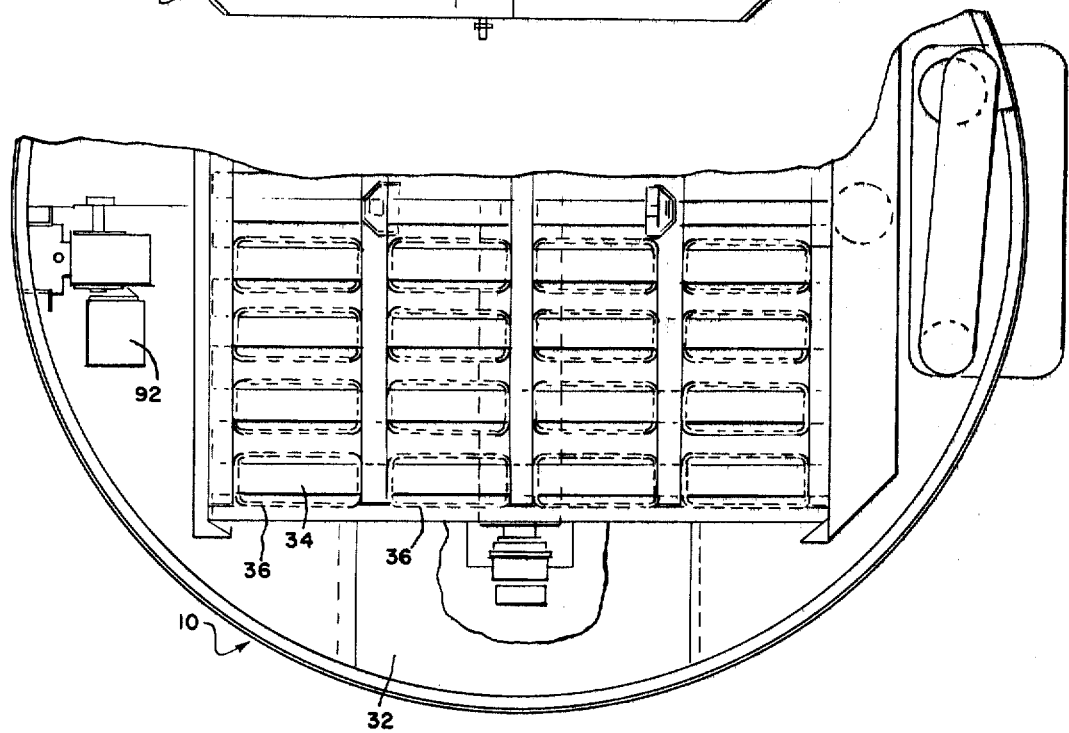
FIG. 8 is a partial top plan view of the dust collector apparatus in the plenum chamber and the top of the filter tubes.

The upper portion of the housing is provided with a cyclone stage generally designated 18. The cyclone stage 18 is provided with an air inlet passage 20 formed in the wall of the housing and has a convolute baffle 22 therein with the passage 20 being disposed in the wall of the housing tangentially so that the incoming air is swirled in a convolute stage with the heavier particles being thrown outwardly by centrifical force from the main stream of air flow and being discharged from the housing through the discharge passage 24. The bottom of the cyclone stage is provided with an annular horizontal plate member 26 with the aperture 28 in the plate forming an inlet passage to an air plenum chamber 30 therebelow. The bottom of the plenum chamber is provided with a filter tube plate or sheet 32 therein having a plurality of openings 34 (FIG. 8) therein to receive preferrably a rectangular shaped filter bags or tubes 36 therein. The filter tubes 36 are open at the ends and can be made of cloth or other fabric material or synthetic material such as dacron and the like, and the tubes are self-supporting and do not have any rigid support means therein such as a spiral-spring or the like, because the air passes in an inside out direction through them.

The lower end of the filter tubes 36 are secured by automotive or aviation type screw to rims 38 (FIG. 10) extending above lower tube sheet mount 40A on top of hopper 40 by an adjustable clamp 42. Hopper 40 is disposed on a lower or bottom clamp sheet 48. The hopper 40 is provided with an outlet 50 for removing contaminants and dirt therefrom as desired, for example by an auger or screw conveyor or the like.

The openings 34 are formed by downwardly depending skirts 35 (see FIG. 9) having an inwardly bent lip 37 to receive the rectangular clamp 39 which is snapped into place in opening 34, sandwiching the bag between it and skirt 35. Clamp 39 is preferrably plastic material and has cross bars 41 (see FIG. 11).

Figure 4:
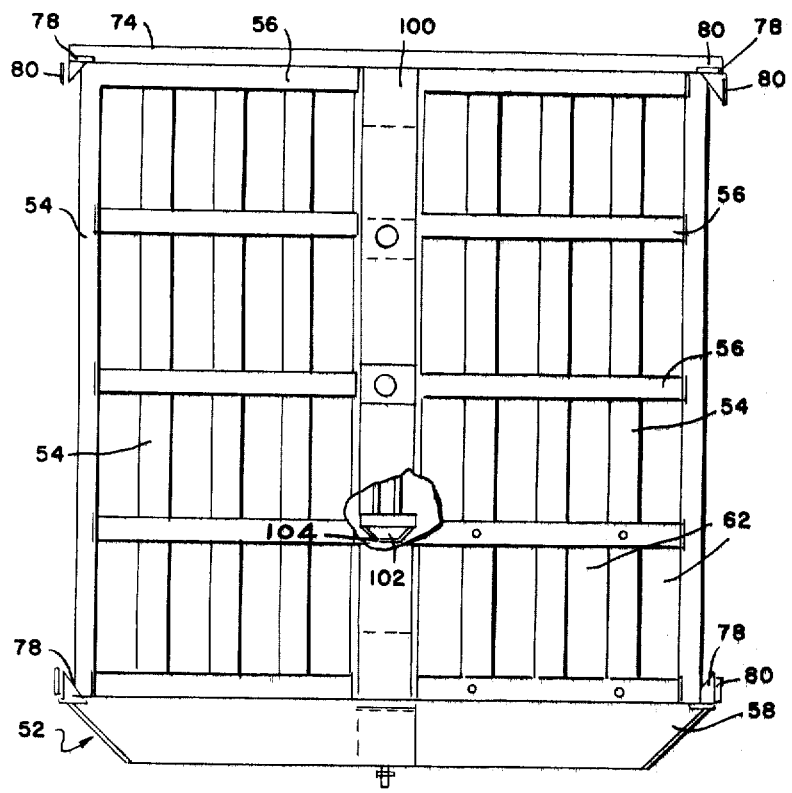
FIG. 4 is a top plan view of the blow case manifold.

The dust collector is provided with a traveling blow case manifold 52 (see FIG. 4) of substantially square configuration. The manifold comprises a plurality of spaced hollow air tubes 54 forming one set of tubes and another plurality of cross tubes 56 disposed at right angles with the set of tubes 54. The tubes 54 communicate with an air inlet casing 58 for supplying air under pressure thereto, while the cross tubes 56 communicate with the air casing 58 through cross tubes 54. The tubes 54 and 56 are positioned with respect to one another so that rectangular openings 62 of substantially the same dimension are formed between the tubes for receiving the filter tubes 36 therethrough.

Figure 2:
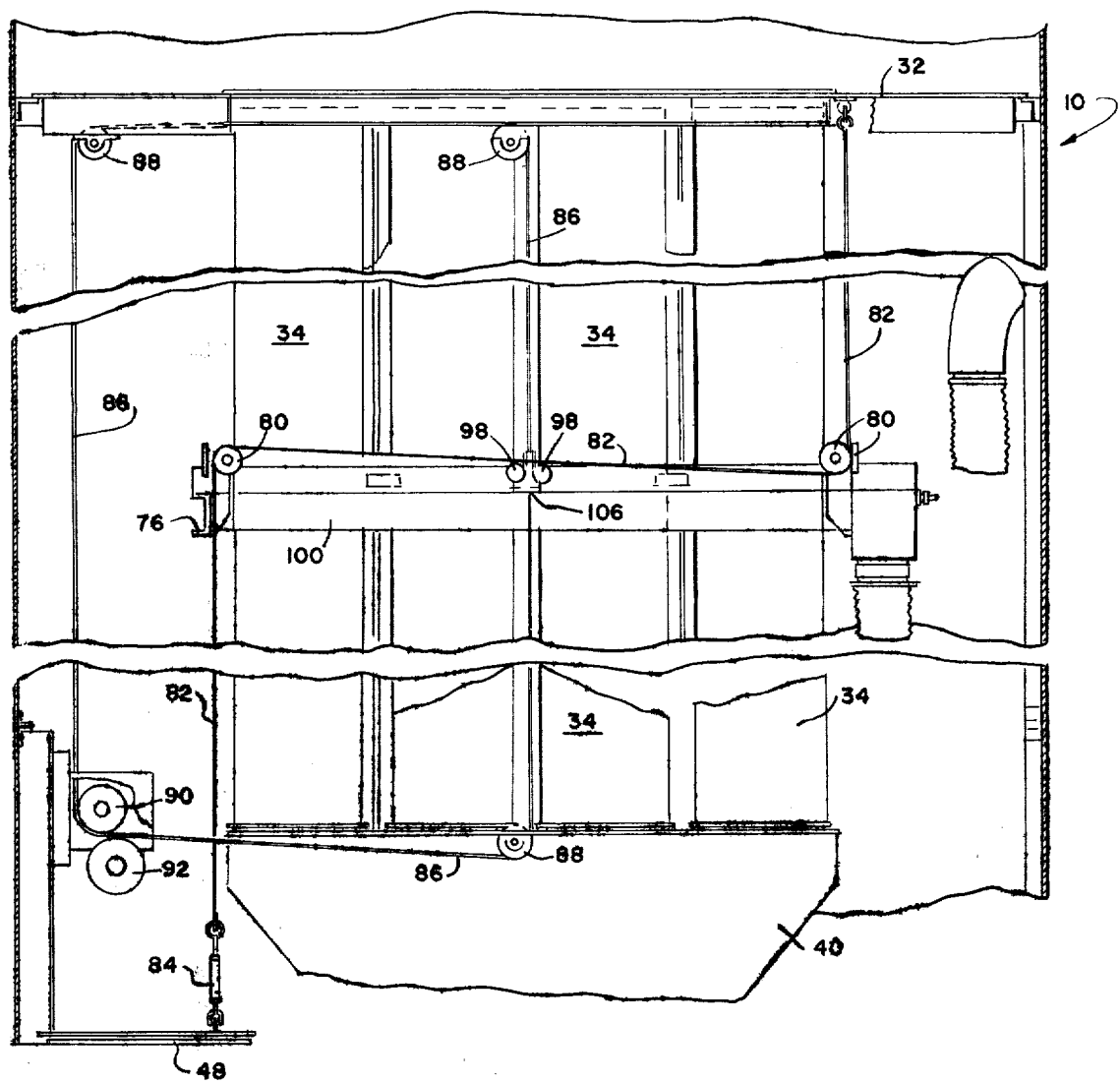
FIG. 2 is a side elevational view illustrating the dust collector apparatus embodied in the present invention including the blow case manifold and driving means therefore, with the flexible hose means for supplying air thereto.

The portions of the tubes 56 and 54 adjacent the perimeter of the opening 62 are provided with a plurality of jets of small orifices or openings therein so as to permit jets of small orifices or openings to be dispersed into or directed toward the center of air to be dispersed into or directed toward the center of the spaces 62. The manifold is disposed in the housing 12 between the upper and lower tube sheets member 32 and 40A respectively, as best shown in FIGS. 1 and 2.

The air is supplied to the inlet casing 58 through a flexible duct 64 disposed in the housing and supplied with air from a blower or fan 68 disposed in the housing on the bottom 16 thereof. The duct 64 is a sufficient length so that it will maintain its connection to the air casing 52 when the manifold is disposed in its upper most position, indicated at 70 in FIG. 3, or at its lower most position indicated in dotted lines at 72 in FIG. 3.

The tubes 54 and 56 are preferrably seamless tubes made of steel and the manifold is provided with horizontal members 74 on one side and an air inlet casing 58 on the other side to which are secured triangular brackets 78 (FIG. 4) adjacent its ends by any suitable means. The brackets 78 are of triangular configuration and have pulleys 80 secured to the opposite legs thereof for carrying cables 82 for guiding the blow case manifold as it travels up and down in the housing. The upper and lower ends of the cables 82, as best seen in FIG. 5, are connected by adjustable turn buckles 84 to the tube sheet 32 and deck plate 48.

The manifold is carried by an endless chain 86 (FIGS. 2 and 6) disposed over sprocket wheels 88 secured to the tube plate 32 and to a drive sprocket 90 driven by an electric motor 92.

The chain 86 is connected to the manifold by a connector link 94 (FIG. 6) and two roller chains 96 carried by round bars 98. The bars 98 are secured to a hollow square member 100 extending through the center portion of the manifold 52 between the member 74 and air casing 58 to which its opposite ends are connected. The hollow member 100 is provided with openings 102 therein adjacent its opposite portions through which vertical U-shaped members 104 extend. The end of members 104 are secured to the tube sheet 32 and deck plate 48.

The opposite end of the sprocket chain 86 is secured to member 100 at 106 (FIGS. 2 and 6) after passing over a lower sprocket 88.

The outer ends of the roller chains 96 are each secured to a toothed pawl or lug 106 carried by a horizontal rod 108 carried by member 100. The rod 108 is journaled in the member 103 and has two coiled springs 110 disposed thereon. The springs have one end secured to the rod 108 and a free end or turn 112 bearing against a horizontal plate 114 secured to the outer face or side of the pawl 106. The pawl is normally positioned in a vertical position, shown in FIG. 6 with the roller chains 96 preventing the pawl from being displaced outwardly, to the dotted line position as shown in FIG. 6.

The chains 96 will normally hold the pawl 106 in the position shown in FIG. 6, against the tension in the free turn 112 attempting to bias the pawl outwardly. However, should the chain 96 break, the force of the coil springs 110 will cause the pawl 106 to kick outwardly to the dotted line position shown in FIG. 6, so as to embed the teeth 113 of the pawl into the vertical U-shaped members 104 to prevent the entire manifold from falling down in the housing and thus prevent damage thereto, as well as to the flexible filter bags or tubes therein.

Figure 3:
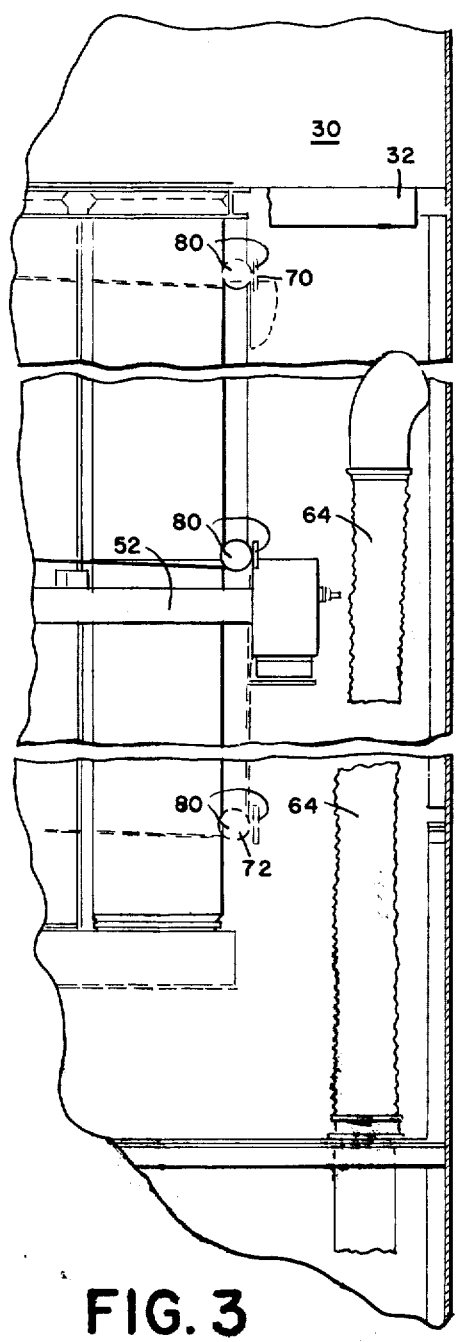
FIG. 3 is a partial side elevational view illustrating the upper most and lower most positions of the blow case manifold.

The drive motor 92 is a conventional reverse motor, and conventional limits switches, not shown are provided in the housing, adjacent the top filter tube sheet 32 and the lower tube sheet 40A so that when the manifold reaches its upper most position, as shown in FIG. 3 or its lower most position as shown therein, the limit switches cause the electric motor to reverse itself so that the lift chain 86 will move in the opposite direction over its drive sprocket to reverse the travel of the manifold.

In operation, when it is desired to collect dust and other contaminants from the interior of a factory or building, a blower, not shown, will exit the air stream therefrom through the air inlet passage 20 into the cyclone stage 18 of the dust collector housing. The incoming stream of air will cause the heavier particles to be thrown outwardly by centrifical force and to flow tangentially against the inner surface of the cyclone stage following a flow stream patterned after the convolute baffle 22 so the heavier contaminants will be discharged through the outlet chamber 24 and can be removed or collected in any desired manner.

The remaining portion of the air stream will pass through the opening 28 and into the air plenum 30 after which some of the lighter particles may fall vertically downwardly directly into the hopper 40. The remaining particles in the air stream will form a cake on the interior of the filter tubes 36 with the clean air passing through the porous filter tubes and into the space 37 in the housing between the filter tube sheet 32 and the sheet 48.

Simultaneously, while the air stream is passing through the chamber 37, the electric motor 92 is placed in operation so that the lift chain 86 will cause the manifold to travel continuously up and down the chamber 37.

At this time, the blower 68 is also in operation so that a steady supply of air is passed through the flexible duct 64 and enters the manifold inlet casing 58 and the tubes 54 and 56 so that the air under pressure is discharged through the numerous orifices. This air forms a curtain or stream of air that impinges upon the outer surface of each rectangular filter tube 36 which is disposed in each space 62 between the tubes. Thus, any cake formed on the inner surface of the tubes is constantly knocked therefrom and falls vertically downwardly into the hopper 40 where it may be removed from time to time through any conventional auger or screw means or other desired means. The clean air will then be discharged through the discharge passage 116 and may be piped or communicated back to the interior of the building.

Should there be any failure in the lift chain or the lifting mechanism of the manifold, the brake holding chains 96 will permit the pawl members 106 to be lifted or forced outwardly, as shown in FIG. 6, to the dotted line position therein so that the pawl teeth will catch in the U-shaped members 104 and prevent the manifold from crashing or falling downwardly in the housing, thus averting any damage to the manifold structure or to the filter tube bags in the collector, until the chain can be replaced.

Inasmuch as various changes may be made in the relative location and arrangement of the several parts without departing from the spirit and scope of the invention, it is not meant to limit the invention except by the following claims.

What is claimed is:

1. A dust collector comprising a housing with a first cyclone stage having an inlet opening and a second stage filter with the cyclone stage being at the top of the housing, said stages being in communication with one another, said second stage comprising a tube sheet and a plurality of flexible filter tubes depending from said tube sheet and open at their upper and lower ends, hopper means communicating with the lower open ends of said filter tubes, blow case means disposed to travel substantially the length of said tubes to dislodge contaminant cake from the interior of said tubes, including a manifold having a plurality of uniformly spaced air tubes disposed at substantially right angles to each other forming tube sets with longitudinal rows of orifices therein to emit a row of air jet streams therefrom, with the space formed by adjacent tubes of said tube sets providing an opening for a filter tube, and a filter tube extending through at least one said tube opening and said orifices extending along the sides of said tubes facing said filter tube opening, means for supplying air to said blow case means, guide means for properly centering said blow case means with respect to said filter tubes as it travels, and drive means for moving said blow case means along said filter tubes, and safety brake means operatively connected to said drive means to hold said blow case means in a fixed position if said drive means fails due to breakage.

2. The dust collector of claim 1 wherein said air supply means includes a fan and a flexible elongated duct of adjustable length in communication therewith and said manifold.

3. The dust collector of claim 1 wherein said blow case means is substantially square in configuration and said housing has a top and bottom filter tube sheet, and roller means are disposed at the corners of said blow case means, and flexible cables are secured to said tube sheets and carried by said roller means to guide and center said blow case means in said housing when it moves along said tubes.

4. The dust collector of claim 3 wherein said roller means comprise a triangular bracket with a roller disposed on each leg thereof.

5. The dust collector of claim 4 wherein the rollers on one side of said blow case means are parallel and in alignment with each other and form a roller set.

6. The dust collector of claim 5 wherein there is a cable carried by each roller set, said cable having one end secured to one of said tube sheets and passing over one roller of said set, and under the other roller of said set and having its opposite end secured to the other tube sheet.

7. The dust collector of claim 1 wherein said drive means includes an endless chain connected to said blow case means and a drive motor in said housing.

8. The dust collector of claim 7 wherein said chain is connected at one end to the top of said blow case means, passes over a drive sprocket operatively connected to said drive motor, and has its other end connected to the bottom of said blow case means.

9. The dust collector of claim 8 wherein said one end of said drive chain has a connecting link connected to two chains with their opposite ends extending transversely of the housing and secured to opposite sides of said blow case means.

10. The dust collector of claim 9 wherein said brake means comprise pawls with teeth journalled on shafts carried on opposite sides of said blow case means with coiled springs on said shafts having a turn with a free end bearing against one side of each of said pawls normally urging it in a direction toward the inner surface of said housing, and vertical members disposed adjacent said pawls to be engaged thereby if said chains break, said chains being connected to the opposite side of said pawls to normally maintain them out of contact with said vertical members.

11. The dust collector of claim 1, wherein said brake means comprise pawls carried by said blow case means and a bar means adapted to be engaged by said pawls if said chain means breaks.

12. The dust collector of claim 11 wherein biasing means are provided for engaging said pawls to normally maintain said pawls out of contact with said bar means.

13. The dust collector of claim 12 wherein said bar means comprises vertical bars extending through opposite sides of said blow case means, and said pawls comprise lugs with teeth, said lugs being journalled on shafts carred on opposite sides of said blow case, and said biasing means are coiled springs on said shaft having a turn with a free end in contact with said lugs.

14. The dust collector of claim 1, wherein said filter tube sheet has depending skirts on its upper open ends and clamp means are provided to snap onto the top of said filter tubes.

15. The dust collector of claim 14 wherein said clamp means is a rectangular plastic member with cross bars.

16. The dust collector of claim 15 wherein a bottom tube sheet is provided and said filter tubes have adjustable clamping means securing them thereto.

17. The dust collector of claim 1 said cyclone stage inlet opening being a tangential inlet, a convolute baffle in said first stage and a plenum chamber having a central inlet opening, said tube sheet forming the bottom of said chamber, and clean air discharge means in said housing disposed adjacent the lower end of said filter tubes.

* * * * *